INVENTOR.
Leo S. Sullivan Jr.
BY
His Attorney

United States Patent Office 3,355,787
Patented Dec. 5, 1967

3,355,787
METHOD FOR MAKING A BALL JOINT
Leo S. Sullivan, Jr., Dayton, Ohio, assignor to General Motors Corporation, Detroit, Mich., a corporation of Delaware
Filed Nov. 30, 1964, Ser. No. 414,662
10 Claims. (Cl. 29—149.5)

ABSTRACT OF THE DISCLOSURE

This invention relates to a method for making a ball joint assembly and includes the steps of injection molding and acetal resin and fluorine containing material mixture into a cup-shaped configuration having substantially cylindrical sides, etching away a portion of the acetal resin to expose the low friction fluorine containing material, axially telescoping the curved head portion of a stud into the cup-shaped configuration, assembling a deformable metal socket member having substantially cylindrical sides over the telescoped assembly and cold forming the substantially cylindrical siding radially inwardly under pressure.

---

This invention relates to bearing means formation and, more particularly, to an etched injection-molded ball joint assembly.

Assembly of multiple ball joint parts can increase cost of material and labor considerably, and thus both economic and production problems can be overcome by use of procedure and component assembly in accordance with the present invention.

An object of the present invention is to provide an injection-molded ball joint seat portion of combination plastic materials including acetal resin with fluorine-containing means imbedded therein initially having an injection-molded cup-shaped configuration with rounded semi-spherical bottom and cylindrical sides subjected to etching away of a predetermined amount of the acetal resin to expose low friction fluorine-containing means and to cold-deforming of the cylindrical portion into a socket portion curved to complement a semi-spherical ball portion of a stud for which the semi-spherical bottom provides a covering integral with the seat portion.

A further object of this invention is to provide ball joint seat processing including steps of mixing granulated acetal resin and fluorine-containing means, injection molding the combined acetal resin and fluorine-containing means into a cup-shaped configuration rounded at one end at least along inner surfacing thereof integral with initially substantially cylindrical siding, for torque control etching away the acetal resin under predetermined conditions of temperature, time and chemical action including rinse and drying whereby there is an exposing of fluorine-containing means, and cold-deforming the substantially cylindrical siding radially inwardly to complement a curved head of a stud means in assembly with the outer socket portion.

Another object of this invention is to provide ball joint assembly procedure including steps of extruding, chopping and mixing granulated acetal resin and fluorine-containing polytetrafluoroethylene means, injection molding the combined acetal resin and fluorine-containing means into a cup-shaped configuration rounded at one end at least along inner surfacing thereof integral with initially substantially cylindrical siding, for torque control etching away the acetal resin under predetermined conditions of temperature in a range between 230° and 250° F., time in a range between 30 seconds and 2 minutes, and chemical action with predominately perchloroethylene solution including rinse and drying totalling in a range between 2½ minutes and 7 minutes whereby there is an exposing of fluorine-containing means, and cold-deforming the substantially cylindrical siding radially inwardly to complement a curved head of a stud means in assembly with an outer socket portion.

Further objects and advantages of the present invention will be apparent from the following description, reference being had to the accompanying drawings wherein preferred embodiments of the present invention are clearly shown.

Figure 1:
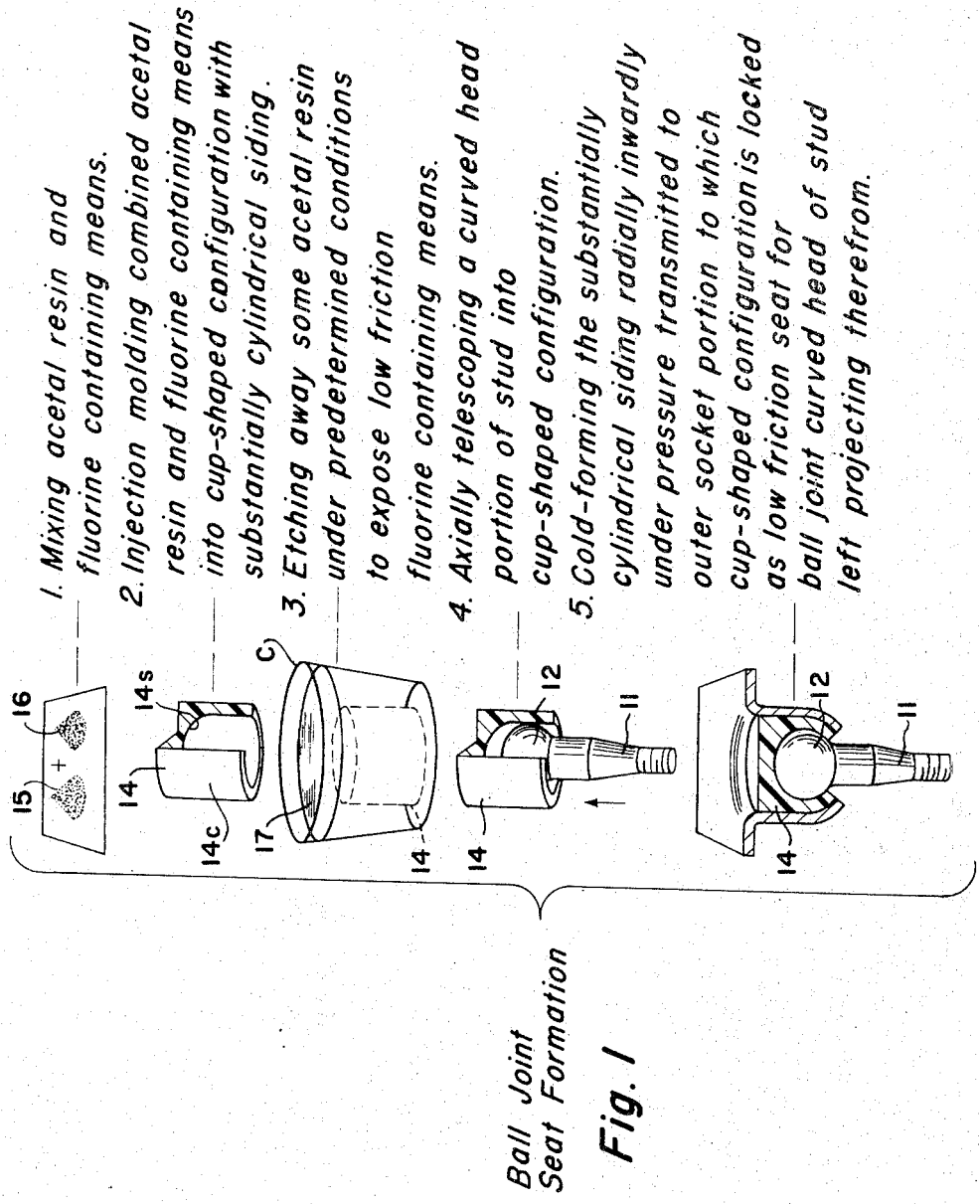
FIGURE 1 is representative of procedural steps in accordance with the present invention.

During mass production of vehicle components such as ball joint means there are many factors which contribute to achieving success including economic and technical considerations. Durability and satisfactory performance at a minimum cost is sought particularly in bearing components such as ball joint means which are important so far as proper vehicle operation is concerned. If ball joint means provide too little friction there is a tendency for a vehicle to encounter undesirable shimmy. Conversely, if there is too much friction, a vehicle becomes difficult to steer. Thus, an optimum condition of friction is desirable during vehicle operation combined with low break away torque characteristics so as to provide proper feel for a vehicle operator as to the steering and turning characteristics. Use of compound woven fabrics including fluorine-containing resin means such as polytetrafluoroethylene as a bearing surface can involve problems of controlling break away torque due to provision of too much or too little of the fluorine-containing resin means. At present, manufacture of ball joint means incorporating compound woven fabrics can require a multiplicity of parts all of which add to labor and material costs. The present invention provides improvement in procedure and component assembly requiring a minimum number of parts and resulting in a reduction of cost both as to the parts per se as well as for the labor and material.

Accordingly, use of compound weaving of fabrics is obviated and raw materials can be readily converted into a manufactured product providing advantages in performance and characteristics as well as durability previously not believed possible for such ball joint means. Procedure in accordance with the present invention includes at least five basic steps illustrated in FIGURE 1 of the drawings. A main part of the ball joint means is the bearing or ball joint seat formation used within a socket portion and engaged by a curved head portion of a stud. Raw materials used in accordance with the present invention for the bearing means or ball joint seat formation include acetal resin which is a strong plastic material having good tensile strength, stiffness and creep resistance. Acetal resin is not only tough but is also sufficiently resilient though stable under variations in temperature and humidity. This acetal resin plastic material is thus granulated and chopped into small particles. A further plastic resin material used in combination with the acetal resin in accordance with the present invention is a fluorine-containing resin means or polytetrafluoroethylene which can be mixed in fiber form having flock in a range between 1/64 and 1/8 of an inch long subject to granulation and chopping as mixed with the complementary acetal resin means. The combined polytetrafluoroethylene and acetal resin means is then extruded in a mixed condition and proceeds to the next procedural step in accordance with the present invention.

The mixing of the acetal resin and fluorine-containing resin means with extrusion thereof permits relatively inexpensive injection molding into a cup-shaped configuration with substantially cylindrical siding having walls of relatively uniform thickness. The internal surfacing of this cup-shaped configuration can be injection molded to a predetermined shape including a curved inner bottom surface adapted to be engaged by a curved head portion of a stud of ball joint structure. However, the problems of torque control noted earlier are such that the cup-shaped configuration resulting from the injection molding step are preferably subjected to a step of etching away a predetermined amount of the acetal resin while the cup-shaped configuration with substantially cylindrical siding remains in the initial shape. The cup-shaped configuration is molded to form substantially one-half of the spherical surface for curved inner surfacing engageable by the rounded head of the stud. The combination acetal resin and fluorine-containing means as injection molded is a relatively rigid cup-shaped structure that can be readily processed further during etching which is accomplished by dipping the cup-shaped configuration into a predominantly perchloroethylene solution. A specific formulation for this etching solution can be given as 769.6 grams or 96.2% by weight of perchloroethylene; 2.4 grams or 0.3% by weight of para-toluene sulfonic acid; 3% by weight or 24 grams of para dioxane; and 0.5% by weight or 4 grams of a silicon material such as kieselguhr, infusorial earth and the like. This etching of the acetal resin is done for torque control particularly and the etching solution having a composition as exemplified by the foregoing summary is maintained at a temperature in a range between 230° and 250° F. The cup-shaped configuration remains in the etching solution for a period of time in a range between 30 seconds and 2 minutes. Next there is a drying of the cup-shaped configuration transferred to a forced draft oven maintained at a temperature in a range between 240° and 250° F. for a time period in a range between 2½ minutes and 7 minutes. The etched cup-shaped configuration is then rinsed in running hot tap water or the like for substantially one minute and allowed to dry at room temperature.

The next step in the ball joint seat formation procedure includes axially telescoping a curved head portion of a stud into the cup-shaped configuration and mating thereof with a deformable metal socket portion. Finally, there is a cold-forming of the substantially cylindrical siding radially inwardly under pressure transmitted to the outer socket portion resulting in a preloading and deformation radially inwardly of the substantially uniform thickness walls to complement the curvature of the head portion of the stud with the latter being left projecting therefrom.

Figure 2:
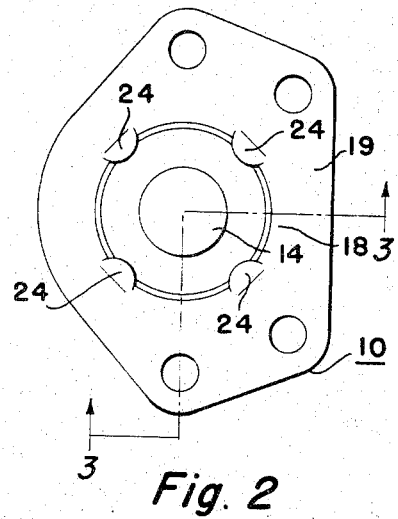
FIGURE 2 is a plan view of a ball joint assembly in accordance with the present invention.
Figure 3:
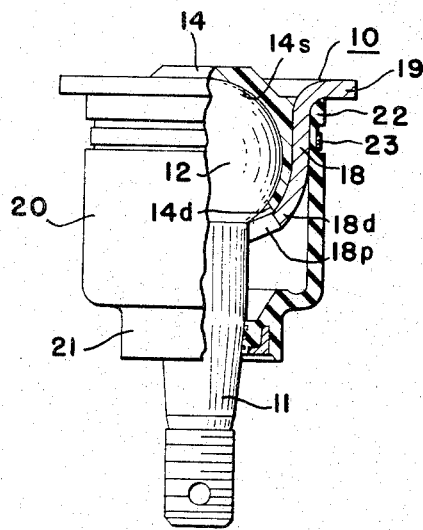
FIGURE 3 is a partially sectioned elevational view of the assembly of FIGURE 2.

FIGURE 2 illustrates a ball joint means generally indicated by numeral 10 having features in accordance with the present invention. This ball joint means 10 is further shown in FIGURE 3 and includes a stud 11 having a curved or spherically rounded head portion 12 which is telescopically mated into ball joint seat formation 14 of the injection molded acetal resin and fluorine-containing means, FIGURE 1 illustrates the ball joint seat formation in its initial cup-shaped configuration with substantially cylindrical siding 14c as well as inner spherical surfacing 14s. Also in FIGURE 1, acetal resin means designated by reference numeral 15 as well as fluorine-containing means designated by reference numeral 16 are represented in a location adjacent to the step 1 wording. The cup-shaped formation which is injection molded is illustrated adjacent to the wording for step 2, and as to the etching in FIGURE 1 there is an illustration of a container C having an etching solution 17 therein into which the cup-shaped formation 14 is dipped or immersed. This solution 17 has a chemical composition as previously described.

Again referring to FIGURES 2 and 3 of the drawings, it is noted that the cup-shaped bearing portion 14 alone forms a closure at the end of the ball joint means 10 in a location remote from the stud 11 and substantially axially thereof. The ball joint means 10 includes only the three parts including the stud-head designated by reference numerals 11–12 as well as the injection molded bearing portion 14 and a socket means 18 having an outwardly extending flange portion 19 suitably apertured for mounting as to vehicle suspension components and chassis structure in a well known manner. The socket portion 18 has an inwardly deformed lower periphery 18d subjected to cold-deforming transmittal of pressure to deflect and radially inwardly preload the cup-shaped portion 14 along an initially cylindrical portion 14c designated in FIGURE 1 which as deformed is identified as 14d in FIGURE 3. It is to be noted that the thickness of the cylindrical siding initially, and after cold-deforming, is substantially uniform throughout and complementary to the curved surfacing of the head portion 12 carried by the stud 11. The socket portion has a suitable passage 18p through which the stud 11 projects to one side thereof and the cold forming of the socket portion 18 radially inwardly results in a preloading of the combination acetal resin and polytetrafluoroethylene resin means 14 into an interlocked assembly. To shield against entry of dirt, moisture and foreign materials, a sealing boot 20 of elastomeric material is fitted to have lower periphery 21 thereof snugly in engagement with the stud 11 and an upper enlarged edging 22 thereof is held by a magnetically deformed metal banding 23 in a tight and snug fit. The magnetic deformation of the banding 23 forms no part of the present invention and can be accomplished in accordance with a metal forming device and method similar to that shown by a Patent 2,976,907—Harvey et al. issued Mar. 28, 1961. Equipment for such magnetic deforming purposes is commercially available. It is to be understood that the sealing boot 20 can be modified and structure thereof is interchangeable with other types of sealing boots such as disclosed by copending patent applications Ser. No. 232,158—Mathues et al., now Patent No. 3,208,290, and Ser. No. 232,159—Sullivan, now Patent No. 3,208,779, both filed Oct. 22, 1962 and belonging to the assignee of the present invention. Also reference can be made to seal structure shown in a Patent 3,097,060—Sullivan issued July 9, 1963 and belonging to the assignee of the present invention.

Further referring to the drawings in FIGURE 2, it is noted that the socket portion can have radially inwardly and axially swaged or deformed portions 24 which serve to retain the ball joint seat formation 14 in place without need for any separate external covering previously provided and welded or fastened such as by rivets and the like to the flanged part 19 of the socket portion. Such additional cover parts are entirely eliminated with a savings in cost and material.

Figure 4:
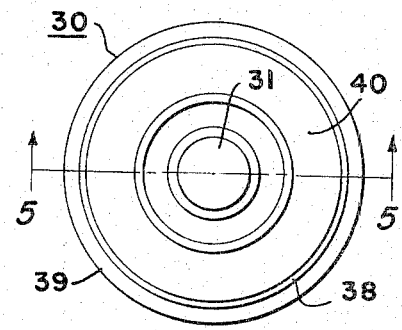
FIGURE 4 is a plan view of another ball joint assembly in accordance with the present invention.
Figure 5:
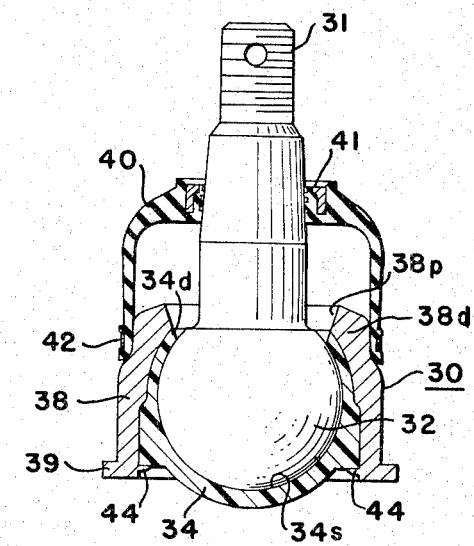
FIGURE 5 is a cross-sectional view taken along line 5—5 in FIGURE 4.

FIGURES 4 and 5 of the drawings show another ball joint means generally indicated by numeral 30 and having features also in accordance with the present invention. A threaded stud means 31 carrying a curved head or ball portion 32 is provided to complement curved inner surfacing 34s of a ball joint seat formation 34 which was initially provided with substantially cylindrical siding of uniform thickness walls subject to cold deforming into a radially inwardly curved portion 34d as shown in FIGURE 5. A socket means 38 of metal includes a laterally outwardly projecting flange portion 39 as well as a radially inwardly deformed annular portion 38d surrounding a passage 38p through which the stud 31 projects. A sealing boot 40 of elastomeric material has a radially inner end 41 thereof snugly in engagement with the stud. An enlarged end 42 of the boot 40 is held by a banding 42 of metal secured in a manner previously noted. A plurality of radially inwardly swaged and axially deformed portions 44 agains can hold the combination acetal resin and polytetrafluoroethylene resin means in the cup-shaped formation 34 in place. The ball joint means of FIGURES 2 and 3 can be suitably used as a pivotal juncture for an upper control arm steering knuckle assembly and the structure of FIGURES 4 and 5 can be used for a pivotal assembly of a lower control arm steering knuckle assembly.

Figure 6:
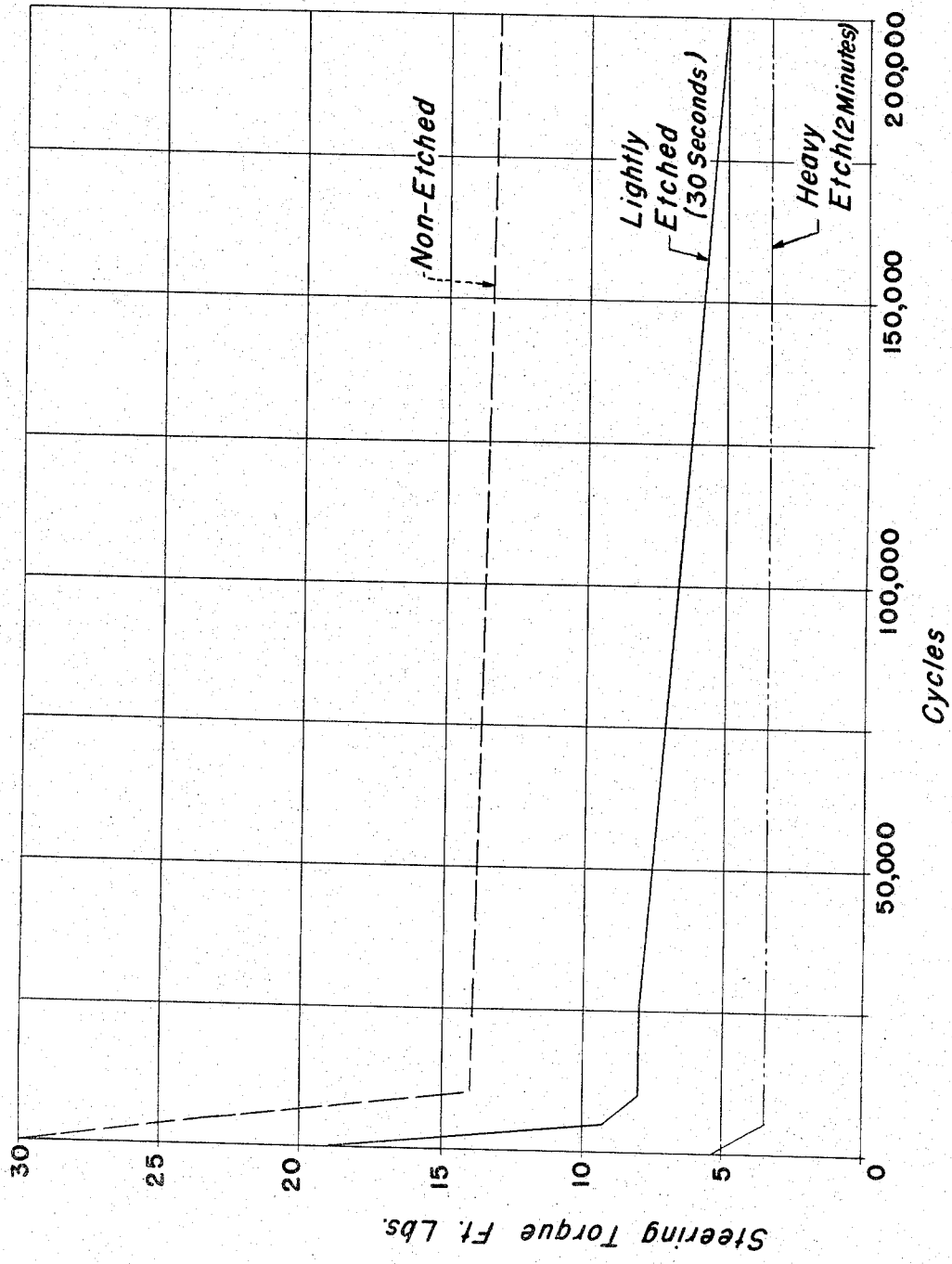
FIGURE 6 is a graphical illustration of steering torque characteristics for a ball joint seat assembly with and without treatment in accordance with the present invention.

The etching of the acetal resin means permits modification of the friction encountered and a steering torque control is thereby provided. The acidic etching solution only exposes and does not deleteriously affect the fluorine-containing resin means or polytetrafluoroethylene imbedded in the acetal resin. Use of the cylindrical configuration initially simplifies the telescopic interfit of the socket portions such as 18 and 38 and the cold-deforming thereof radially inwardly causes a preloading of the combination plastic resin means of the ball joint seat formations 14 and 34. The ball joint means 10 and 30 having the ball joint seat formations 14 and 30 respectively thereof subjected to etching result in performance characteristics as to steering torque control as illustrated in FIGURE 6 providing a comparison for the combination acetal resin and fluorine-containing resin means combination in both non-etched and etched conditions. It is readily apparent in the graphical illustration of FIGURE 6 that the non-etched combination material has substantially greater steering torque and steering effort required whereas the low-friction fluorine-containing resin means is exposed as a result of the etching to provide substantially less effort for steering as represented in the lower of the graphical representations provided in FIGURE 6. No lubrication was provided during the obtaining of the data illustrated in FIGURE 6 and an axial load of 1000 pounds was applied to the ball joint means having structural features in accordance with the present invention. Also it is to be noted in the graphical representation of FIGURE 6 that a low torque condition is obtained but controlled for the etched ball joint structural means. The ball joint seat formation etched in accordance with the present invention for torque control purposes can be readily injection molded to form a curved surfacing complementary to a head portion carried by a stud and cold-deformed with a metal socket portion therewith. By reduction in the number of parts required to only three basic ball joint components, it is possible to achieve superior wear and durability conditions with less cost and proper torque control. For purposes of citing an example, it is noted that with only a 30 second etch a torque which is considerably too high at approximately 12 foot pounds is obtained, whereas with an etch of substantially one minute to reduce the frictional characteristics a torque value of substantially 7 foot pounds is obtained. Finally, using an etching period of two minutes a substantially more controlled torque rating of 5½ foot pounds is obtained. It is to be noted particularly that the etching is in no way utilized for retention of any coating layer to a bearing surface and the like, but rather to expose fluorine-containing resin means or fibers in the acetal resin and polytetrafluoroethylene resin combination for the purpose of achieving desired frictional characteristics. Also it is to be noted that considerable strength and stability is provided for the ball joint seat formations such as 14 and 34 to withstand heavy loading and severe axial shocks such as encountered on so called "Belgian block" tests during which metal fatigue and failure of other vehicle parts can be found to occur much earlier than any wearing of the combination acetal resin and fluorine-containing resin means as the ball joint seat formations. Such "Belgian block" testing is comparable to continuous driving along railroad ties and both upper and lower ball joint seat assemblies made in accordance with the present invention and having features as illustrated demonstrate advantages of the present invention. The combination acetal resin and fluorine-containing resin means is sufficiently ductile to withstand cold-forming deformation without cracking and ball joint means have been assembled with no lubricant per se either in the form of liquid or grease along the bearing surfaces.

The advantages include factors such as retention of original shape and resilience of the plastic materials of the combination acetal resin and polytetrafluoroethylene plastic materials subjected to the etching away of the acetal resin as described. Such retention of resilience and original shape assures wear-compensating and preloading features. Use of a minimum number of parts assures reduction of cost and versatility in applications. The substantially uniform wall thickness of the ball joint seat formations such as 14 and 34 both during initial cylindrical formation and subsequent cold-deforming results in a facilitated assembly procedure. The axial interfitting of the head portion of the stud relative to the cylindrical siding can be readily accomplished without need for any excessive use of force and also the cylindrical siding permits telescopic interfit of the ball joint seat formations such as 14 and 34 readily into concentric relationships as to the socket portions 18 and 38 without need for any funnel or gathering of any plastic in attempts to force the components axially together. The combination acetal resin and polytetrafluoroethylene resin means is sufficiently strong to provide closing off of the end of the ball joint means opposite to that from which the stud projects without need for any separate metal cover portion. The acetal resin material is commercially available from differing sources of supply under trade names of Celcon and Delrin, both based upon formaldehyde as a building unit chemically. Polymerization of formaldehyde in water with an ionic catalyst produces a low molecular weight solid having poor mechanical properties and low thermal stability. However, the molecular structure of acetal resin involves unbranched polyoxymethylene chains ($-OCH_2OCH_2-$) of great length, normally averaging more than 1000—$CH_2O$ units. Thus the polymer is a linear acetal resin with dimensional stability yet capable of withstanding cold deformation as encountered with the injection molded seat portion in accordance with the present invention. Superpolyoxymethylene is unusual among thermoplastics in its resistance to organic solvents. There are no common solvents for it at low temperatures. However relatively high concentrations of strong acids or strong bases will achieve etching of superpolyoxymethylene under controlled conditions exemplified by the present disclosure.

As to ball joint torque control, it is to be noted that this is a factor that can become relatively important as a result of compromises inherently made in designing a vehicle front suspension for example. Ball joint means in such a vehicle suspension are provided to permit vertical and pivotal wheel motions. Very low torque in such ball joints allows too much freedom of motion resulting in tendency to shimmy. Conversely, high torque therein causes hard and difficult steering as well as harshness in ride comfort conditions.

Ball joints of metal to metal and plain reinforced plastics constructions are dependent upon grease for lubrication and frictional properties. The friction is therefore variable depending upon the degree of lubrication and type of lubricant. Also, friction of a lubricated bearing exhibits a stick-slip characteristic of a higher breakaway than running friction, the degree of breakaway depending upon the type of lubricant and condition of the bearing surfaces. It is possible for this break-away or stick-slip to be great enough to become objectionable in steering, for example, to produce a feeling of "stickiness," and in ride, to induce harshness because of the resistance of the ball joints to vertical wheel motion on relatively smooth roads. This is referred to as "suspension lock-up" or "boulevard jounce" since the suspension system stays static otherwise and jitter results. Compound woven fabrics of cotton and Teflon employed in low friction bearings perform similar to metal to metal or plain cotton laminate bearings when first molded due to the presence of the thermosetting reinforcing resin on the Teflon low friction fibers. Once this resin is removed or worn off, the Teflon is presented to the bearing surface and the bearing then exhibits low frictional properties. Similarly, with an acetal resin means containing short Teflon fibers, such fibers are substantially coated with the thermoplastic resin when molded and such a bearing surface has high frictional properties and requires initial or break-in lubrication. As the acetal resin wears away, the Teflon fibers are exposed and the bearing then exhibits lower frictional properties.

The present invention provides initial exposure of the Teflon fibers after molding directly by chemically removing sufficient acetal plastic base which remains as a carrier and body portion for additional assembly purposes previously described. Thus the Teflon fibers are immediately available as exposed for bearing lubricity utilizing self-lubricating characteristics thereof. Therefore, the lubricity and resultant friction of the bearing can be controlled by the extent to which the Teflon fibers are exposed. No lubrication is required for such a bearing either initially or subsequently.

The type of bearing surface provided by exposing the Teflon fibers is ideal for a suspension bearing because of the frictional properties of Teflon. Instead of the high breakaway torque followed by a decrease in friction with increasing surface speed characteristics of a greased bearing, Teflon bearings have a very low breakaway torque but with a rising coefficient of friction with an increase in surface rubbing speed. This results in low steering effort during vehicle parking, for example, and suspension freedom in the low deflection range. Also, the rising coefficient of friction with increasing surface speed produces a viscous damping effect on shimmy or wheel tramp tendencies. Thus either steering or vertical forces tend to dampen out shimmy because at the higher the rubbing speed, there is an accompanying higher Teflon friction condition.

While the embodiments of the present invention as herein disclosed constitute preferred forms, it is to be understood that other forms might be adopted.

What is claimed is as follows:

1. Ball joint assembly procedure, comprising, steps of extruding, chopping and mixing granulated acetal resin and fluorine-containing means, injection molding the combined acetal resin and fluorine-containing means into a cup-shaped configuration with substantially cylindrical siding of substantially uniform thickness, etching away the acetal resin under predetermined conditions of temperature, time and chemical action including rinse and drying whereby there is an exposing of fluorine-containing means, axially telescoping a curved head portion of a stud into the cup-shaped configuration, assembling a deformable metal socket having substantially cylindrical sides over the telescoped assembly and cold forming the substantially cylindrical siding radially inwardly under pressure transmitted to the outer socket portion, thereby pre-loading and deforming radially inwardly the substantially cylindrical siding of substantially uniform thickness to complement the curvature of the head portion of the stud.

2. The procedure of claim 1 wherein said etching occurs in a solution maintained at a temperature in a range between 230° and 250° F. for a period of time in a range between thirty seconds and two minutes.

3. The procedure of claim 2 wherein said drying occurs at a temperature in a range between 240° and 250° F. for a period of time in a range between two and one half minutes and seven minutes.

4. Ball joint assembly procedure, comprising, steps of extruding, chopping and mixing granulated acetal resin and fluorine-containing polytetrafluoroethylene means, injection molding the combined acetal resin and fluorine-containing means into a cup-shaped configuration rounded at one end at least along inner surfacing thereof integral with initially substantially cylindrical siding of substantially uniform thickness, etching away the acetal resin under predetermined conditions of temperature of a range between 230° and 250° F., time of a range between thirty seconds and two minutes, and chemical action with predominantly perchloroethylene solution including rinse and drying totalling in a range between two and one half minutes and seven minutes whereby there is an exposing of fluorine-containing means, axially telescoping a curved head portion of a stud into the cup-shaped configuration, assembling a deformable metal socket having substantially cylindrical sides over the telescoped assembly and cold forming the substantially cylindrical siding radially inwardly under pressure transmitted to the outer socket portion, thereby pre-loading and deforming radially inwardly the substantially cylindrical siding of substantially uniform thickness to complement the curvature of the head portion of the stud.

5. The procedure of claim 4 wherein said cold-deforming occurs under electromagnetically exerted force applied through the outer socket portion.

6. The procedure of claim 4 wherein said injection molding results in cup-shaped configuration purposely for axially telescoping the curved head thereto prior to said cold-deforming.

7. Bearing means formation, comprising, mixing of plastic carrier resin and low-friction plastic means into combination with each other, injection molding the combined resin and plastic means into a cup-shaped configuration with substantially cylindrical siding of substantially uniform thickness, etching away some plastic carrier resin means under predetermined conditions to expose the low friction plastic means, axially telescoping a curved head portion of stud into the cup-shaped configuration, axially telescoping a curved head portion of a stud into the cup-shaped configuration, assembling a deformable metal socket having substantially cylindrical sides over the telescoped assembly and cold forming the substantially cylindrical siding radially inwardly under pressure transmitted to the outer socket portion, thereby preloading and deforming radially inwardly the substantially cylindrical siding of substantially uniform thickness to complement the curvature of the head portion of the stud.

8. The formation of claim 7 wherein a swaging of the outer socket portion radially inwardly locks the cup-shaped configuration thereto against axial separation.

9. The formation of claim 7 wherein said etching for torque control occurs with a solution of substantially 96% by weight of perchloroethylene, 0.3% by weight of paratoluene sulfonic acid, 3% by weight of paradioxane and 0.5% by weight of a silicon material exemplified by kieselguhr and infusorial earth.

10. The formation of claim 9 wherein said etching solution is maintained at a temperature in a range between 230° and 250° F. and said etching occurs for a time period in a range between thirty seconds and two minutes.

References Cited
UNITED STATES PATENTS

| | | | |
|---|---|---|---|
| 2,885,248 | 5/1959 | White | 308—239 |
| 2,979,353 | 4/1961 | Sellers | 287—85 |
| 3,063,744 | 11/1962 | Flumerfelt | 287—87 |
| 3,085,312 | 4/1963 | Evans | 29—149.5 |
| 3,089,198 | 5/1963 | Eirhart | 264—242 |
| 3,193,910 | 7/1965 | Evans | 29—149.5 |

THOMAS H. EAGER, *Primary Examiner.*